United States Patent [19]

Kolp, Jr. et al.

[11] Patent Number: 4,867,333
[45] Date of Patent: Sep. 19, 1989

[54] HIGH-PRESSURE PIN PLUG

[75] Inventors: Robert J. Kolp, Jr., Ivoryton; Stephen E. Anderson, Old Saybrook; Jeffrey C. Dickey, Westbrook, all of Conn.

[73] Assignee: The Lee Company, Westbrook, Conn.

[21] Appl. No.: 204,715

[22] Filed: Jun. 10, 1988

[51] Int. Cl.⁴ .................................. B65D 39/04
[52] U.S. Cl. .................... 220/234; 220/352; 220/358; 29/522.1
[58] Field of Search ............ 220/3, 352, 358, 233, 220/234; 229/522.1

[56] References Cited

U.S. PATENT DOCUMENTS

| | | | |
|---|---|---|---|
| 1,838,136 | 12/1931 | Draper | 220/352 |
| 2,806,752 | 9/1957 | Ginn | 29/522.1 X |
| 2,821,323 | 1/1958 | Lee | 29/522.1 X |
| 3,451,583 | 6/1969 | Lee | 29/522.1 X |
| 3,825,146 | 7/1974 | Hirmann | 29/522.1 X |
| 4,091,841 | 5/1978 | Beneker et al. | 29/522.1 X |

Primary Examiner—Stephen M. Hepperle

[57] ABSTRACT

A small bore expansion plug having an inner wedge pin and a plug body with an outer hard surface with small, peripheral V-shaped grooves, a partly hemispherical end wall at its inner end and a tapered coaxial bore for receiving the wedge pin. To provide a radial expansion force within an acceptable tolerance between the plug body and the wall of its mounting bore, the wedge pin has a coaxial bore to form a high-strength spring and the plug body has a base material with a yield strength providing the desired plug body resistance to deformation.

13 Claims, 1 Drawing Sheet

HIGH-PRESSURE PIN PLUG

The present invention relates to a new and improved high-pressure pin plug for sealing access and other bores in metal castings, metal forgings and other metal parts.

It is a principal object of the present invention to provide a new and improved pin plug of the type disclosed in U.S. Pat. No. 2,821,323 of Leighton Lee, II, granted Jan. 28, 1958 and entitled "Pin Plug". In accordance with a principal object of the present invention, a new and improved pin plug is provided which is capable of sealing very high hydraulic system pressures up to 8,000 psi or more in metal castings, metal forging and other metal parts made of high-strength and high-hardness materials.

Prior art expansion plugs of the type disclosed in the aforementioned U.S. Pat. No. 2,821,323 were originally designed for sealing hydraulic system pressures up to 3,000 psi and for withstanding proof pressures up to 12,000 psi and blowout pressures up to 20,000-30,000 psi. However, hydraulic system pressures have increased substantially and hydraulic component parts are being made of substantially higher strength and substantially harder materials to contain the substantially higher pressures. A new expansion plug has been found to be needed for use with such materials and for sealing the higher hydraulic pressures. In part, that is because the higher strength and hardness of the component part materials creates certain problems. Previously, the expansion plug locked itself in place by causing localized deformations in the wall of its mounting bore with the peripheral lands and grooves of the plug. With the harder, higher-strength component part materials and the substantially higher hydraulic pressures, prior art expansion plugs do not adequately grip the wall of the plug mounting bore, in part because the plugs no longer cause adequate localized deformations in the harder, higher-strength materials.

With the harder, higher-strength materials and higher hydraulic pressures, it has been determined that the expansion plug must (a) provide improved surface-to-surface interengagement with the wall of its mounting bore wall for adequately locking the expansion plug within its mounting bore, (b) have elongation characteristics which produce the desired plug expansion force within an acceptable tolerance, (c) have good machinability which facilitates plug manufacture and (d) have good fatigue and corrosion resistance which gives a long useful, service-free plug life.

In accordance with the present invention, a new and improved high-pressure pin plug of the type described is provided which meets the foregoing requirements, which is useful with high-strength, high-hardness hydraulic component part materials and which is useful with such materials for sealing hydraulic pressures up to 8,000 psi or more.

Another object of the present invention is to provide a new and improved high-pressure pin plug of the type described for small access and other bores (e.g. providing a plug mounting bore with a 0.093 to 0.406 inch diameter) in high-strength, high hardness metal parts formed by casting, forging or by other means, which will be economical to manufacture and install and which will be effective in sealing hydraulic system pressures up to 8,000 psi or more.

Another object of the present invention is to provide a new and improved high-pressure pin plug of the type described for sealing hydraulic system pressures up to 8,000 psi or more and for withstanding minimum proof pressures up to 32,000 psi or more and minimum blowout pressures up to 64,000 psi or more.

Other objects will be in part obvious and in part pointed out in more detail hereinafter.

The invention consists in the features of construction, combination of elements and arrangement of parts exemplified in the construction hereinafter described and the scope of the invention will be indicated in the appended claims.

DESCRIPTION OF PREFERRED EMBODIMENT

Figure 1:
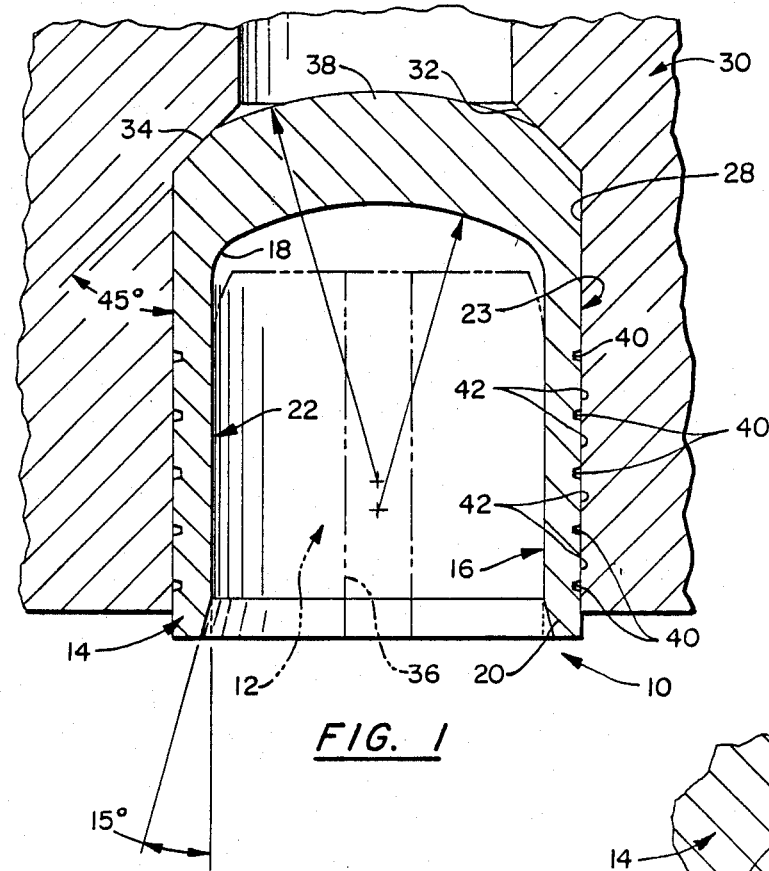
FIG. 1 is an enlarged, longitudinal section view of an installation of a preferred embodiment of a pin plug constructed in accordance with the present invention, showing an outer body of the plug in section and an inner pin of the plug in broken lines.

Referring now to the drawings in detail, wherein like numerals are used to designate identical elements, a new and improved high-pressure pin plug 10 incorporating a preferred embodiment of the present invention is shown consisting of an inner generally cylindrical pin 12 and an outer, generally cylindrical plug body 14 having an internal, blind, coaxial bore 16 for receiving the inner pin 12. The bore 16 in the plug body 12 has a constant axial taper between a large radius transition 18 (e.g. having a 0.020 inch radius) at the inner end of the bore 16 and an enlarged chamfered opening 20 at the outer end of the bore 16. A frusto-conical socket 22 is thereby formed which extends nearly the entire length of the bore 16 and which has its larger diameter at its outer end (i.e. at the inner end of the opening 20). A relatively low taper angle is provided (which preferably has a taper of 0.125 inches per foot, but which may have a greater or lesser taper or a taper which is essentially flat).

The inner pin 12 has an outer generally cylindrical surface 24 with a relatively low taper angle (preferably conforming exactly to the taper, if any, of the socket 22, but which may be slightly greater or lesser than the socket taper) which forms a frusto-conical pin wedge 24 extending nearly the entire length of the pin 12 from its outer end to a convex, partly spherical, nose 26 at its inner end.

The high-pressure pin plug 10 is designed to provide the desired amount of radial expansion of the outer plug body 14 in accordance with the strength and hardness of the material of the associated hydraulic component part 30. The radial interference between the unstressed inner pin 12 and outer body 14 is predetermined for each plug size. To accommodate that predetermined radial interference, the inner pin 12 is formed with the rounded nose 26 at its inner end and the bore in the outer body is formed with the 15° chamfered opening 20 to facilitate positioning and driving the pin 12 into the socket 22 and to minimize the installation force and surface galling. Also, the pin 12 is precoated with a suitable wax lubricant.

The pin plug 10 is used and installed in essentially the same way as that described in the aforementioned U.S. Pat. No. 2,821,323. Accordingly, the description in that patent of the manner of use and installation of the pin plug is incorporated herein by reference. Briefly, a reamed counterbore 28 is provided in the hydraulic component part 30 very slightly larger than the diameter of the outer cylindrical surface 23 of the unstressed plug body 14. According to the present invention, the diameter of the reamed counterbore 28 is preferably 0.0010 inches, ± 0.0005 inches, greater than the outer diameter of the unstressed plug body 14. The plug body 14 is mounted within the counterbore 28 with its inner end engaging a locating shoulder 32 at the inner end of the counterbore 28. Preferably, a locating shoulder 32 having a conventional 45° chamfer is provided, in which case the inner end of the plug body 14 is machined with a conforming 45° chamfer or shoulder 34 to firmly engage the locating shoulder 32.

The average diameter of the frusto-conical pin wedge 24 is related to the average diameter of the frusto-conical socket 22 to provide a predetermined diametral interference for expanding the plug body 14 outwardly by driving the inner pin 12 into the plug body 14 until the outer end of the pin 12 is flush with the outer end of the plug body 14 as shown in broken lines in FIG. 1. The plug body 14 is thereby expanded outwardly by the pin wedge 24 into engagement with the reamed, smooth cylindrical wall of its mounting bore 28.

In order to ensure that the plug 10 is firmly seated within its mounting bore 28 and capable of withstanding hydraulic pressures up to 8,000 psi or more, the dimensions of the pin wedge 24 are established to provide a substantial radial force between the plug body 14 and the associated part 30. That radial force is dependent in part on (a) the radial expansion of the plug body 14 by the pin wedge 24, (b) the radial expansion of the associated part 30 and (c) the elastic/plastic elongation of the plug body 14. The diameter of the pin wedge 24 is made greater than the diameter of the plug body socket 22 by an amount corresponding to, but greater than the desired radial expansion of the plug body 14. For example, the unstressed interference or difference in the OD of the inner pin wedge 24 and the ID of the plug body socket 22 is 0.007 to 0.008 inches. The radial expansion of the plug body 14 caused by that interference is controlled in part by providing a cylindrical coaxial through bore 36 in the inner pin having a diameter predetermined for each OD or size of the plug 10. The inner pin 12 is thereby made radially compressible with the degree of compressibility being a function of its OD/ID ratio and behaves like a high strength spring within the plug body 14.

The outer body 14 is designed to structurally withstand hydraulic system pressures, including providing improved fatigue resistance against cyclical or fluctuating pressures, up to 8,000 psi or more, and to withstand minimum proof and blow-out pressures up to 32,000 psi or more and 64,000 psi or more respectively, by providing a thick, partially spherical, convex end wall 38 at the inner end of the plug body 14. The end wall 38 has a convex, partly spherical outer surface and a concave, partly spherical inner surface. The concave inner surface extends outwardly to the peripheral, large radius transition 18 between that concave surface and the inner end of the socket 22. The centers of curvature of the convex and concave surfaces are slightly spaced along the axis of the plug body 14 as shown in FIG. 1 so that the radial thickness of the convex end wall 38 is greatest at the axis of the plug body 14 and diminishes gradually toward the perimeter of the end wall 38. The large radius transition 18 is provided to reduce stress concentration and thereby eliminate crack initiation points.

Figure 3:
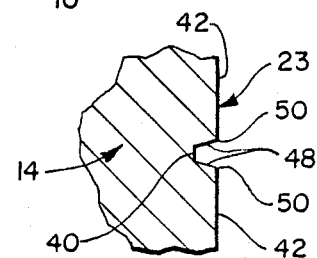
FIG. 3 is an enlarged, longitudinal section view, partly in section, of a portion of the outer body, showing a peripheral groove thereof.
Figure 2:
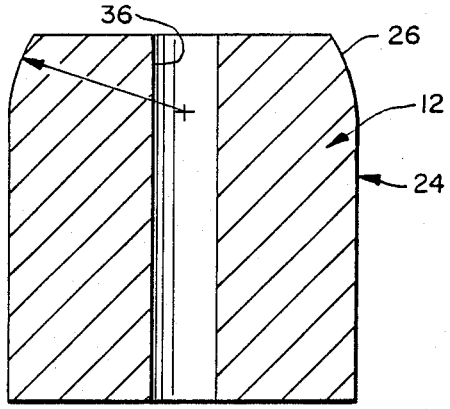
FIG. 2 is an enlarged, longitudinal section view, partly in section, of the inner pin.

The plug body 14 is shown formed with five identical, equally axially spaced, peripheral, generally V-shaped, annular grooves 40. In smaller plugs, only three or four grooves are provided. (For example, three grooves are provided on 0.093 to 0.156 inch diameter plugs; four grooves are provided on 0.187 to 0.218 inch diameter plugs: and five grooves are provided on 0.250 to 0.343 inch diameter plugs.) The grooves 40 are axially positioned to lie between the transverse end planes of the socket 22 and the pin wedge 24 of the installed pin 12. The grooves 40 have a total axial width which is approximately one-fourth (when five grooves are provided) or less (when three or four grooves are provided), of the total axial width of the intermediate peripheral lands 42 and even a lesser factor of the total axial width of the land area extending between the transverse end planes of the installed pin wedge 24. Each V-shaped groove 40 has a 0.004 to 0.006 inch width and a 0.003 to 0.004 inch depth. Each groove 40 is formed with inwardly tapered sidewalls 48 (e.g. having approximately a 20° taper) as shown in FIG. 3 to enhance the effectiveness of each circular gripping edge 50 formed at the intersection of the groove sidewall 48 and the outer cylindrical surface 23 of the adjacent land 42. As the plug body 14 is expanded during installation of the inner pin 12, generating a substantial radial force between the plug body 14 and its mounting bore wall 28, the plug body 14 is radially expanded elastically and is plastically deformed. The plastic deformation causes axial flow of the material at the periphery of the plug body which reduces the axial width of the peripheral grooves 40 of the installed plug. The circular gripping edges 50 are thereby made more acute to enhance or at least maintain their engagement with and effectiveness in gripping the wall of the plug body mounting bore 28.

It has been found that a plug body 14 employing a machineable base material of lesser hardness and an outer surface material of substantially greater hardness provides the desired interengagement between the outer surface 23 of the plug body 14 and the wall of its mounting bore 28 and provides for firmly locking the plug 10 in position against hydraulic system pressures up to 8,000 psi or more and for withstanding minimum proof and blowout pressures of 32,000 psi or more and 64,000 psi or more respectively. For example, the base material of the plug body 14 is a precipitation hardened stainless steel (e.g. a 15-5PH or 17-4PH stainless steel) having a yield strength of 125–185 ksi or a precipitation hardened aluminum alloy (e.g. a 7075 aluminum alloy) having approximately the same or comparable yield strength.

The composite plug body 14 consists of a base material of certain hardness and yield strength and an outer surface material of substantially higher hardness. It has been found that an experimentally established elongation capability of the base material is required to provide the desired expansion fit between the plug body 14 and its mounting bore. If the yield strength of the base material is too high and therefore its elongation resistance is too high, the plug body 14 will crack under the resulting excessive radial expansion force between the plug body and its mounting bore wall. If the yield strength of the base material is too low, the plug body resistance to deformation will be too low and the radial expansion force between the plug body and its mounting bore will be too low. As a result, the installed plug 10 will have low sealing and blowout pressures.

Also, contrary to expectations, it has been found that a substantially better locking action is achieved by providing a thin substantially harder outer surface on the plug body 14 (having a thickness in the order of 0.0001 to 0.001 which is substantially less than the depth of the peripheral grooves 40). For example, an aluminum alloy plug body with a "hard anodized" surface (e.g. having a thickness of approximately 0.001 inches) increases the blowout pressure typically 50% over untreated aluminum alloy parts. Also, for example, a hard exterior chromium coating (e.g. having a thickness of 0.0001 to 0.0005 inches) over a base material of 15-5pH or 17-4PH stainless steel provides the desired gripping or locking action with a very hard, high-strength hydraulic component part material such as precipitation hardened steel and titanium (e.g. 15.5 PH Cres and Ti-6 L-4V titanium).

The hard surface material of the plug body 14 is preferably substantially harder than the material of the associated component part to enable the outer surface 23 of the plug body 14 to firmly grip the wall of its mounting bore along substantially the entire length of the peripheral lands of the plug body 14. As indicated, the total axial length of the land area is substantially more than 80% of the total axial length of the inner pin wedge 24 by reducing the number of peripheral grooves 40 to no more than five and by reducing the axial width of each groove 40 (for example to 0.004 to 0.006 inches). The grooves 40 still provide adequate space for plastic flow of the surface material of the plug body 14 during pin installation. Also, the grooves 40 still retain the circular locking edges 50 at the transition between the peripheral lands and the groove side walls 48.

The material of the taper pin 12 may be the same as, but is preferably slightly harder than the base material of the plug body 14. For example, the pin material has a Rockwell C hardness of 38 and the base material of the plug body 14 has a Rockwell C hardness of 36 (both when used with a hydraulic component part material having a Rockwell C hardness of 37 and therefore approximately the same as the pin material and base material of the plug body). The hardness of the substantially harder outer surface of the plug body 14, for example, has a Rockwell C hardness of 70 to 72 (provided by a chromium coating) which is approximately twice that of the material of the component part 30 and the base materials of the plug body 14 and pin 12.

It is not completely clear why the described composite plug material, with its harder outer surface, is more effective in locking the plug against high hydraulic operating pressures up to of 8,000 psi or more and the described high minimum proof and blowout pressures. Due to the complex interference forces between the wall of the plug mounting bore 28 and the plug body 14 and between the plug body 14 and the inner pin 12, a complex state of stress exists in all of those elements. Since the deformations are substantial and the elastic limit is exceeded at least in localized areas, the stress and deformation profiles cannot be easily analyzed or determined.

However, as previously indicated, it has been found that the radial expansion force between the plug body and its mounting bore wall can be effectively controlled by selection of the ID of the taper pin 12 and the yield strength of the base material of the plug body 14. The compliance of the expansion fit between the plug body and its mounting bore wall is controlled by using the taper pin as a high-strength spring within the plug body. The axial bore 36 in the pin 12 also provides for venting the air that otherwise would be trapped between the pin 1 and the inner end wall 38 of the plug body 14. The yield strength of the base material of the plug body 14 ensures that the radial expansion force between the plug 10 and its mounting bore wall is maintained within an acceptable tolerance.

The pin control is explained by the control of the elastic and plastic deformation of the pin. As the ID of the pin increases, the elastic deformation of the pin increases and the spring strength provided by the pin 12 is reduced. The optimum pin ID is determined for each plug OD. There follows a chart of dimensions, etc. for eight plug sizes in which the base material of the plug body 14 is a stainless steel having the described hardness and the plug body coating is chromium.

|  |  | #1 | #2 | #3 | #4 |
|---|---|---|---|---|---|
| Reamed Mounting Bore Dia. | (Max) | 0.0947 | 0.1260 | 0.1572 | 0.1885 |
|  | (Min) | 0.0937 | 0.1250 | 0.1562 | 0.1875 |
| Plug Body OD | (Max) | 0.0937 | 0.1250 | 0.1562 | 0.1875 |
|  | (Min) | 0.0928 | 0.1241 | 0.1553 | 0.1866 |
| Plug Body Length | (Max.) | 0.140 | 0.180 | 0.220 | 0.260 |
| Socket Diameter | (Max.) | 0.060 | 0.085 | 0.114 | 0.144 |
| Pin Wedge OD | (Max.) | 0.067 | 0.092 | 0.122 | 0.152 |
| Pin ID | (Max.) | 0.03 | 0.03 | 0.04 | 0.04 |
| Pin Length |  | 0.083 | 0.111 | 0.139 | 0.166 |
| Pin OD/ID Ratio |  | 2.23 | 3.07 | 3.05 | 3.80 |
|  |  | #5 | #6 | #7 | #8 |
| Reamed Mounting Bore Dia. | (Max) | 0.2197 | 0.2510 | 0.2822 | 0.3447 |
|  | (Min) | 0.2187 | 0.2500 | 0.2812 | 0.3437 |
| Plug Body OD | (Max) | 0.2187 | 0.2500 | 0.2812 | 0.3437 |
|  | (Min) | 0.2178 | 0.2491 | 0.2803 | 0.3428 |
| Plug Body Length | (Max.) | 0.296 | 0.337 | 0.375 | 0.451 |
| Socket Diameter | (Max.) | 0.174 | 0.203 | 0.233 | 0.294 |
| Pin Wedge OD | (Max.) | 0.182 | 0.215 | 0.241 | 0.302 |
| Pin ID | (Max) | 0.04 | 0.05 | 0.05 | 0.05 |
| Pin Length |  | 0.194 | 0.222 | 0.250 | 0.305 |
| Pin OD/ID Ratio |  | 4.55 | 4.30 | 4.82 | 6.04 |

It will be noted from the above that in general, as the plug OD increases, the pin OD/ID ratio increases. This is so because a smaller plug mounting bore requires greater pin compliance (smaller OD/ID ratio) while a larger plug mounting bore requires less compliance (larger OD/ID ratio).

As will be apparent to persons skilled in the art, various modifications, adaptations and variations of the foregoing specific disclosure can be made without departing from the teachings of the present invention.

We claim:

1. In a high-pressure pin plug adapted to be mounted in a plug mounting bore in a metal part made of a high strength and high hardness material for sealing a high pressure, comprising a generally cylindrical metal plug body having an inner axial end wall and blind coaxial bore extending between an outer axial end of the plug body and the inner end wall, the coaxial bore having a tapered bore section forming a frusto-conical socket with its larger diameter end at its outer end, said socket extending at least nearly the entire axial length of the plug body bore and the plug body having a plurality of axially spaced, peripheral, annular grooves and lands along the portion of the plug body forming the socket, and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and a diameter larger than the diameter of the socket by a predetermined amount to substantially uniformly expand said peripheral lands of the plug body into engagement with the wall of the plug mounting bore, the improvement wherein the plug body is made of a composite metal material comprising a base material of lesser hardness and a thin outer surface material along said peripheral lands having a composition, different than the base material, with a hardness at least approximately twice that of the base material, wherein the total axial length of said peripheral lands is at least approximately four times the total axial length of said peripheral grooves and wherein the inner pin has a coaxial bore with a predetermined diameter to form a high-strength spring which in part controls the expansion force between the plug body and the wall of its mounting bore.

2. A high-pressure pin plug according to claim 1 wherein the inner end wall of the plug body is a convex, partly spherical end wall.

3. A high-pressure pin plug according to claim 2 wherein the end wall has a thickness which is greater along the axis of the plug body and which diminishes radially outwardly from the axis.

4. In a small size, generally cylindrical high-pressure pin plug having a diameter less than one-half inch and adapted to be mounted in a plug mounting bore in a metal part made of a high strength and high hardness material for sealing a pressure up to 8,000 psi or more, comprising a generally cylindrical metal plug body having an inner axial end wall and a blind coaxial bore extending between an outer axial end of the plug body and the inner end wall, the coaxial bore having a tapered bore section forming a frusto-conical socket with its larger diameter end at its outer end, said socket extending at least nearly the entire axial length of the plug body bore and the plug body having a plurality of axially spaced, peripheral, annular grooves and lands along the portion of the plug body forming the socket and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and a diameter larger than the diameter of the socket by a predetermined amount to substantially uniformly expand said peripheral lands of the plug body into engagement with the wall of the plug mounting bore, the improvement wherein the plug body is made of a composite metal material comprising a base material of lesser hardness and a thin outer surface material along said peripheral lands having a composition, different than the base material, with a hardness at least approximately twice that of the base material, wherein the generally constant taper of the socket is no greater than 0.125 inches per foot and wherein the inner pin has a coaxial bore with a predetermined diameter to form a high-strength spring which in part establishes the expansion force between the plug body and the wall of its mounting bore.

5. A high-pressure pin plug according to claim 4 wherein the inner end wall of the plug body is a convex, partly spherical end wall.

6. A high-pressure pin plug according to claim 5 wherein the end wall has a thickness which is greater along the axis of the plug body and which diminishes radially outwardly from the axis.

7. In a small size, generally cylindrical, high-pressure pin plug having a diameter less than one-half inch and adapted to be mounted in a plug mounting bore in a metal part made of a high strength and high hardness material for sealing a pressure up to 8,000 psi or more, comprising a generally cylindrical metal plug body having an inner axial end wall and a blind coaxial bore extending between an outer axial end of the plug body and the inner end wall, the coaxial bore having a tapered bore section forming a frusto-conical socket with its larger diameter end at its outer end, said socket extending at least nearly the entire axial length of the plug body bore and the plug body having a plurality of axially spaced, peripheral, annular grooves and lands along the portion of the plug body forming the socket, and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and a diameter larger than the diameter of the socket by a predetermined amount to substantially uniformly expand said peripheral lands of the plug body into engagement with the wall of the plug mounting bore, the improvement wherein the plug body is made of a composite metal material comprising a base material of lesser hardness and a thin outer surface material along said peripheral lands having a composition, different than the base material, with a substantially greater hardness than the base material and wherein the inner pin has a coaxial bore with a predetermined diameter to form a high-strength spring which in part establishes the expansion from between the plug body and the wall of its mounting bore.

8. A high-pressure pin plug according to claim 7 wherein the inner end wall of the plug body is a convex, partly spherical end wall.

9. A high-pressure pin plug according to claim 8 wherein the end wall has a thickness which is greatest along the axis of the plug body and which diminishes radially outwardly from the axis.

10. In a high-pressure pin plug adapted to be mounted in a plug mounting bore in a metal part made of a high strength and high hardness material for sealing a high pressure, comprising a generally cylindrical metal plug body having an inner axial end wall and a blind coaxial bore extending between an outer axial end of the plug body and the inner end wall, the coaxial bore having a tapered bore section forming a frusto-conical socket with its larger diameter end at its outer end, said socket extending at least nearly the entire axial length of the plug body bore and the plug body having a plurality of axially spaced, peripheral, annular grooves and lands along the portion of the plug body forming the socket, and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and a diameter larger than the diameter of the socket by a predetermined amount to substantially uniformly expand said peripheral lands of the plug body into engagement with the wall of the plug mounting bore, the improvement wherein the plug body is made of a composite metal material comprising a base material of stainless steel of lesser hardness and an outer surface material along said peripheral lands of chromium of substantially greater hardness, wherein the total axial length of said peripheral lands is at least approximately four times the total axial length of said peripheral grooves and wherein the inner pin has a coaxial bore with a predetermined diameter for form a high-strength spring which in part controls the expansion force between the plug body and the wall of its mounting bore.

11. In a small size, generally cylindrical high-pressure pin plug having a diameter less than one-half inch and adapted to be mounted in a plug mounting bore in a metal part made of a high strength and high hardness material for sealing a pressure up to 8,000 psi or more, comprising a generally cylindrical metal plug body having an inner axial end wall and a blind coaxial bore extending between an outer axial end of the plug body and the inner end wall, the coaxial bore having a tapered bore section forming a frusto-conical socket with its larger diameter end at its outer end, said socket extending at least nearly the entire axial length of the plug body bore and the plug body having a plurality of axially spaced, peripheral, annular grooves and lands along the portion of the plug body forming the socket and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and a diameter larger than the diameter of the socket by a predetermined amount to substantially uniformly expand said peripheral lands of the plug body into engagement with the wall of the plug mounting bore, the improvement wherein the plug body is made of a composite metal material comprising a base material of stainless steel of lesser hardness and an outer surface material on said peripheral lands of chromium of substantially greater hardness, wherein the generally constant taper of the socket is no greater than 0.125 inches per foot and wherein the inner pin has a coaxial bore with a predetermined diameter to form a high-strength spring which in part establishes the expansion force between the plug body and the wall of its mounting bore.

12. In a small size, generally cylindrical, high-pressure pin plug having a diameter less than one-half inch and adapted to be mounted in a plug mounting bore in a metal part made of a high strength and high hardness material for sealing a pressure up to 8,000 psi or more, comprising a generally cylindrical metal plug body having an inner axial end wall and a blind coaxial bore extending between an outer axial end of the plug body and the inner end wall, the coaxial bore having a tapered bore section forming a frusto-conical socket with its larger diameter end at its outer end, said socket extending at least nearly the entire axial length of the plug body bore and the plug body having a plurality of axially spaced, peripheral, annular grooves and lands along the portion of the plug body forming the socket, and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and a diameter larger than the diameter of the socket by a predetermined amount to substantially uniformly expand said peripheral lands of the plug body into engagement with the wall of the plug mounting bore, the improvement wherein the plug body is made of a composite metal material comprising a base material of stainless steel of lesser hardness and an outer surface material on said peripheral lands of chromium of substantially greater hardness and wherein the inner pin has a coaxial bore with a predetermined diameter to form a high-strength spring which in part establishes the expansion force between the plug body and the wall of its mounting bore.

13. In a pin plug adapted to be mounted in a plug mounting bore, comprising a generally cylindrical metal plug body having a coaxial bore extending inwardly from an outer axial end thereof, said coaxial bore having a tapered bore section forming a frusto-conical socket with its larger diameter end at its outer end, the plug body having a plurality of axially spaced, peripheral, annular grooves and lands along the portion of the plug body forming the socket, and an inner generally cylindrical pin adapted to be driven into said socket to expand the plug body into locking engagement with the wall of a plug mounting bore, the inner pin having an external frusto-conical surface engageable with the surface of the socket along at least nearly its entire length, the frusto-conical surface of the pin having a taper approximately the same as the socket taper and diameter larger than the diameter of the socket by a predetermined amount to substantially uniformly expand said peripheral lands of the plug body into engagement with the wall of the plug mounting bore, the improvement wherein the plug body is made of a composite metal material comprising a base material of lesser hardness and a thin outer surface material along said peripheral lands having a composition, different than the base material, with a substantially greater hardness than the base material, wherein the total axial length of said peripheral lands is substantially greater than the total axial length of said peripheral grooves and wherein the inner pin has a coaxial bore with a predetermined diameter forming a high-strength spring which in part controls the expansion force between the plug body and the wall of its mounting bore.

* * * * *

UNITED STATES PATENT AND TRADEMARK OFFICE
CERTIFICATE OF CORRECTION

PATENT NO.   : 4,867,333

DATED        : September 19, 1989

INVENTOR(S)  : Robert J. Kolp, et al

It is certified that error appears in the above-identified patent and that said Letters Patent is hereby corrected as shown below:

Col. 6, claim 1, line 60, insert --a-- before "blind".

Col. 7, claim 3, line 29, substitute --greatest -- for "greater".

Col. 8, claim 6, line 7, substitute --greatest-- for "greater".

Col. 8, claim 7, line 44, substitute --force-- for "from".

Signed and Sealed this

Ninth Day of October, 1990

Attest:

HARRY F. MANBECK, JR.

Attesting Officer

Commissioner of Patents and Trademarks